United States Patent
Chickering et al.

(10) Patent No.: US 7,346,471 B2
(45) Date of Patent: Mar. 18, 2008

(54) WEB DATA OUTLIER DETECTION AND MITIGATION

(75) Inventors: David M. Chickering, Bellevue, WA (US); Ashis Kumar Roy, Kirkland, WA (US); Lawrence Andrew Koch, Seattle, WA (US); David E. Heckerman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 11/219,253

(22) Filed: Sep. 2, 2005

(65) Prior Publication Data

US 2007/0055477 A1    Mar. 8, 2007

(51) Int. Cl.
*G06F 17/18*    (2006.01)
*G06F 15/00*    (2006.01)
(52) U.S. Cl. .............. 702/181; 702/182; 702/187
(58) Field of Classification Search ........... 702/181, 702/182, 183, 187; 709/201, 224
See application file for complete search history.

(56) References Cited

U.S. PATENT DOCUMENTS 6,542,852 B2 *   4/2003   Chen et al. ............... 702/182
7,039,559 B2 *   5/2006   Froehlich et al. ......... 702/187

* cited by examiner

*Primary Examiner*—Bryan Bui
(74) *Attorney, Agent, or Firm*—Amin, Turocy & Calvin, LLP

(57) ABSTRACT

Data slices of historical time series are leveraged to facilitate in more accurately predicting like data slices of future time series. Different predictive models are employed to detect outliers in different data slices to enhance the accuracy of the predictions. The data slices can be temporal and/or non-temporal attributes of a data set represented by the historical time series. In this manner, for example, a historical time series for a network location can be sliced temporally into one hour time periods as a function of a day, a week, a month, a year, etc. Outliers detected in these data slices can then be mitigated utilizing the predictive time series model by replacing the outlier with the expected value. The mitigated historical time series can then be employed in a predictive model to predict future web traffic for the network location (and advertising revenue values) with a substantial increase in accuracy.

16 Claims, 12 Drawing Sheets

WEB DATA OUTLIER DETECTION AND MITIGATION

BACKGROUND

Modern society has come to depend heavily on computers and computer technology. It is especially prevalent in the business arena where companies compete fiercely for customers and product sales. A company with just-in-time inventory and well focused advertising strategies generally produces a product cheaper and delivers it faster to a customer than a competitor. Computer technology makes this type of business edge possible by networking businesses, information, and customers together. Although originally computers communicated to other computers via networks that only consisted of local area networks (LANs), the advent of the Internet has allowed virtually everyone with a computer to participate in a global network. This allows small businesses to be competitive with larger businesses without having to finance and build a network structure.

As computing and networking technologies become more robust, secure and reliable, more consumers, wholesalers, retailers, entrepreneurs, educational institutions and the like are shifting paradigms and employing the Internet to perform business instead of the traditional means. Many businesses are now providing web sites and on-line services. For example, today a consumer can access his/her bank accounts via the Internet and perform a growing number of available transactions such as balance inquiries, funds transfers and bill payment.

Moreover, electronic commerce has pervaded almost every conceivable type of business. People have come to expect that their favorite stores not only have brick and mortar business locations, but that they can also be accessed "online," typically via the Internet's World Wide Web (WWW). The Web allows customers to view graphical representations of a business' store and products. Ease of use from the home and convenient purchasing methods, typically lead to increased sales. Buyers enjoy the freedom of being able to comparison shop without spending time and money to drive from store to store.

Advertising in general is a key revenue source in just about any commercial market or setting. To reach as many consumers as possible, advertisements are traditionally presented via billboards, television, radio, and print media such as newspapers and magazines. However, with the Internet, advertisers have found a new and perhaps less expensive medium for reaching vast numbers of potential customers across a large and diverse geographic span. Advertisements on the Internet may be seen through any content rendered by a browser and/or other client device capable of rendering Internet content. This can include email, game consoles, video-on-demand via TV, web pages, and/or web sites as well as pop-up windows when a particular site is visited and the like.

Thus, global communication networks, such as the Internet, have presented commercial opportunities for reaching vast numbers of potential customers. In the past several years, large amounts of users have turned to the Internet as a reliable source of news, research resources, and various other types of information. In addition, online shopping, making dinner reservations, and buying concert and/or movie tickets are just a few of the common activities currently conducted while sitting in front of a computer by way of the Internet. The proliferation of easy access to the Internet has also facilitated to exponentially grow the traffic to web sites. In some cases, the amount of traffic is extremely large and difficult to estimate. This is unfortunate for those desiring to charge services and advertisements based upon the amount of traffic a web site generates.

Typically, businesses like to be assured that the cost of advertising is justified by some type of guarantee as to the amount of traffic that will be exposed to their advertisements. However, occasionally, fluctuations in traffic to a web site can artificially alter realistic future expectations for that web site's traffic. This may cause a business to pay top dollar for an advertisement with high expectations of substantial exposure of the advertisement to web traffic. This is important to note because meeting expectations is generally how a business stays in business. When expectations are not met, advertisers move along and take their dollars with them. Thus, correctly predicting data, such as web traffic, has a substantial impact on the ever growing Internet business world and elsewhere.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to data anomaly detection, and more particularly to systems and methods for detecting outliers in time series values. Data slices of historical time series are leveraged to facilitate in more accurately predicting like data slices of future time series. Different predictive models are employed to detect outliers in different data slices to enhance the accuracy of the predictions. The data slices can be temporal and/or non-temporal attributes of a data set represented by the historical time series. In this manner, for example, a historical time series for a network location (e.g., web site) can be sliced temporally into one hour time periods as a function of a day, a week, a month, a year, etc. This substantially enhances the accuracy of predictions by allowing like data slices to be compared (e.g., lunch hour web traffic to a network location during a work week, etc.). Outliers detected in these data slices can then be mitigated utilizing the predictive time series model via replacement of the outlier with the expected value. The mitigated historical time series can then be employed in a predictive model to predict future web traffic for the network location with a substantial increase in accuracy. The enhanced predicted web traffic can then be utilized to more accurately assess advertising revenue values and the like for a given time period (i.e., data slice) and the like.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
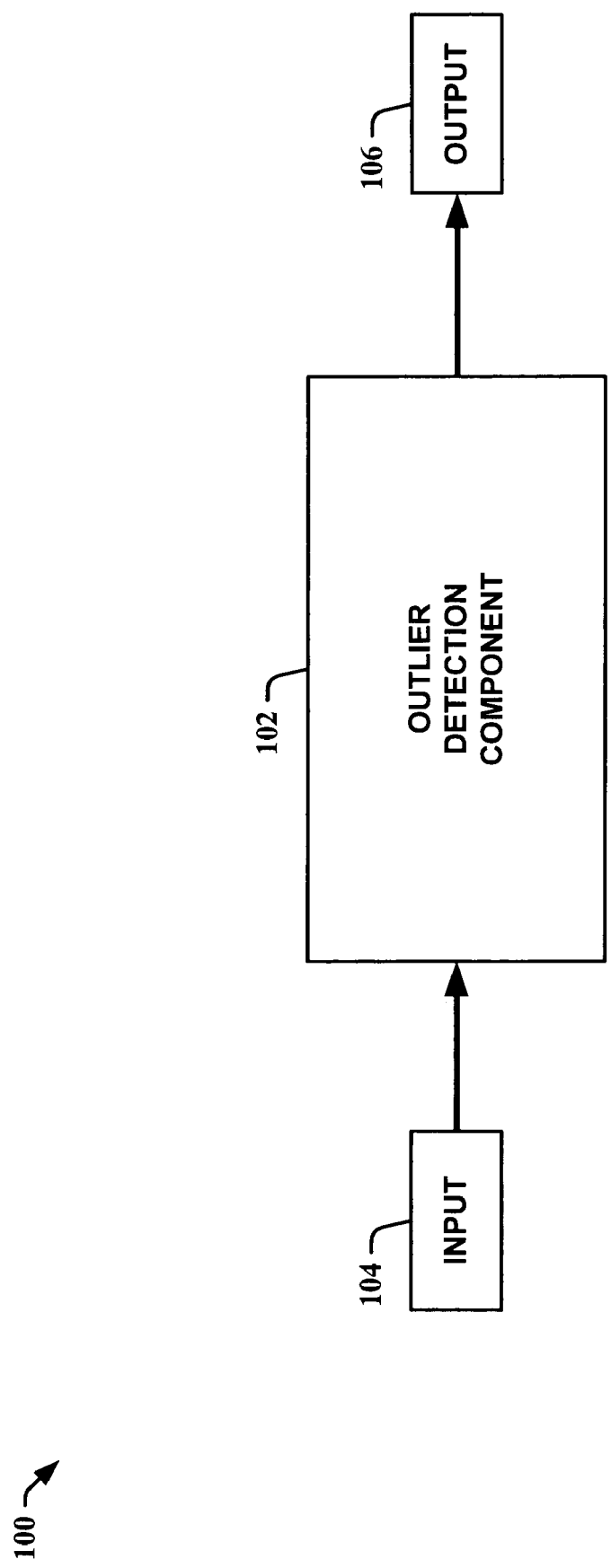
FIG. 1 is a block diagram of an outlier detection system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

It is often desirable to predict, for example, the amount of traffic to a given network location (e.g., web site) so that online advertising can be sold based upon that traffic volume. Most Internet portal sites have several main entry web pages which, through links in rotating content and advertising, have the ability to drive traffic to other (often deeper) parts of the web site. Unfortunately, this often contributes to large swings in traffic volume (either positive or negative) on these web pages due to links being temporarily added or deleted from the web page. Systems and methods provided herein identify these large swings and remove them from an observed time series so that network location traffic volume, for example, can be more accurately predicted. In one instance, web traffic volume is predicted utilizing a statistical model such as, for example, an exponential smoothing model. The statistical model facilitates in detecting anomalous traffic volume on a web page and/or a set of web pages. This technique can also be incorporated into a detection process to facilitate in removing outliers in data utilized to train a web traffic volume model.

By utilizing data slices of attributes of a data set that a historical time series is based on, predictions regarding future like data slices are substantially increased. For example, there are 168 hours within a week, and for any specific hour (e.g., Monday from 3-4), the volume of traffic to a specific network location can be reasonably stable. Thus, 168 time series can be obtained (one for each hour) and utilized to predict the volume of traffic for any particular hour using a statistical model such as an exponential smoothing model and the like that facilitates in removing outliers.

In FIG. 1, a block diagram of an outlier detection system 100 in accordance with an aspect of an embodiment is shown. The outlier detection system 100 is comprised of an outlier detection component 102 that receives an input 104 and provides an output 106. The input 104 is typically a historical time series associated with a data set. The outlier detection component 102 utilizes data slices from the input 104 to facilitate in determining outliers associated with the data slice. The data slices can be temporal and/or non-temporal attributes of a data set represented by the input 104. The non-temporal attributes associated with the data set can include, but are not limited to, demographic, geographic, behavioral, location, and/or advertisement size information and the like. Thus, the output 106 is comprised of detected outliers from the input 104. The outlier detection component 102 can model, for example, a specific hour of a week as a function of the week to facilitate in outlier detection. Typically, there can be a substantial variance as part of a day—reduced activity over lunch periods, increased activity when users arrive home from work, etc. By modeling the time series based on a time period of a week as a function of the week, these variances can be accounted for and utilized appropriately. For example, comparing 11 am-12 pm on Tuesdays allows easier establishment of normal traffic patterns for that particular time period, and, thus, easier detection of 'abnormal' (i.e., outliers) traffic spikes. One skilled in the art can appreciate that the time periods can include, but are not limited to, seconds, minutes, hours, days, and/or multiple hours (e.g., 'afternoons,' 'mornings,' 'evenings,' 'nights,' etc.) and the like. A time period can be also be an approximate and/or an exact period of, for example, a second, a minute, an hour, and/or a day and the like.

As a further example, the outlier detection system 100 can be employed to facilitate in determining advertising costs. An advertisement buyer may want to only advertise during lunch hours when most users tend to surf to a particular web site. However, they generally also want some type of assurance that the advertisement cost is justified by the amount of traffic seen by the advertising location (e.g., web page). By detecting outliers, high and low data extremes can be mitigated and more accurate predictions of web traffic can be obtained. In addition, by breaking down a week into smaller time periods as a function of the week, etc., the seller of the advertisement can increase revenue for particularly high traffic time periods (e.g., lunch periods, etc.). Thus, modeling a specific time period as a function of a day, a week, a month, and/or a year and the like can facilitate both outlier detection and advertising revenue maximization.

Once the outliers are detected, the output 106 can be utilized to facilitate in mitigating the input 104 to allow it 104 to be utilized to facilitate in predicting future time series. The mitigated result allows for increased accuracy of the prediction through the removal of outliers that can cause extreme high and low trends that substantially influence predictions. As noted supra, increasing the accuracy of time series predictions substantially enhances the value of the time series for utilization in such areas as, for example, advertising, asset allocation (e.g., are more servers required to support forecasted web traffic increases, etc.), and/or establishment of peak demand periods and the like. Mitigating the outliers can also reduce the chance of underdelivery of an advertising campaign, increasing customer satisfaction.

Figure 2:
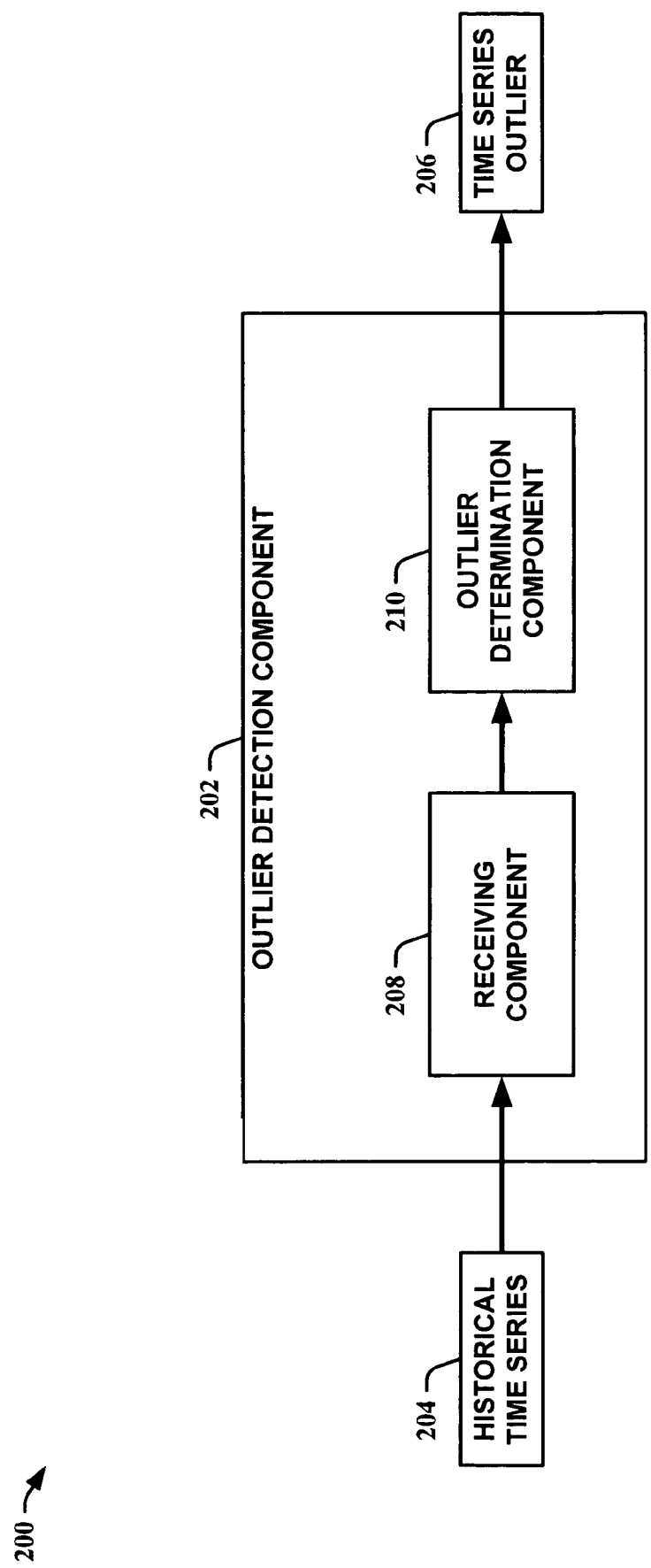
FIG. 2 is another block diagram of an outlier detection system in accordance with an aspect of an embodiment.

Referring to FIG. 2, another block diagram of an outlier detection system 200 in accordance with an aspect of an embodiment is depicted. The outlier detection system 200 is comprised of an outlier detection component 202 that receives a historical time series 204 and provides time series outlier 206. The outlier detection component 202 is comprised of a receiving component 208 and an outlier determination component 210. The receiving component 208 receives the historical time series 204 and relays it 204 to the outlier determination component 210. The outlier determination component 210 determines if an outlier is present in the historical time series 204 and outputs this as time series outlier 206. The determination is facilitated by employing predictive statistical models that provide an expected value that can be utilized to compare with the actual value (discussed in detail infra). This determination can be made based on such factors as a particular time period of a day, a week, a month, a year, etc. and/or an attribute of a data set that the historical time series 204 is based on and the like.

As discussed supra, comparison of like time periods over a given time facilitates in detection of an outlier. In a similar fashion, attribute utilization can also facilitate detection of outliers. In other words, different axes of a time series can be employed to further break down the data set to allow increased detection of outliers. For example, demographics of users can be employed to allow detection based on male and/or female users. If it is desirable, for example, to market a product only to females, the separation of male web site traffic and female web site traffic facilitates in better approximations (i.e., predictions) of web traffic for the target audience (e.g., females). Thus, for example, a web site that carries sporting event news may have traffic spikes associated with a one time boxing event that is a big draw for male users. By utilizing a different attribute, or time series axis, these types of outliers can be detected and mitigated to provide more accurate predictions.

Figure 3:
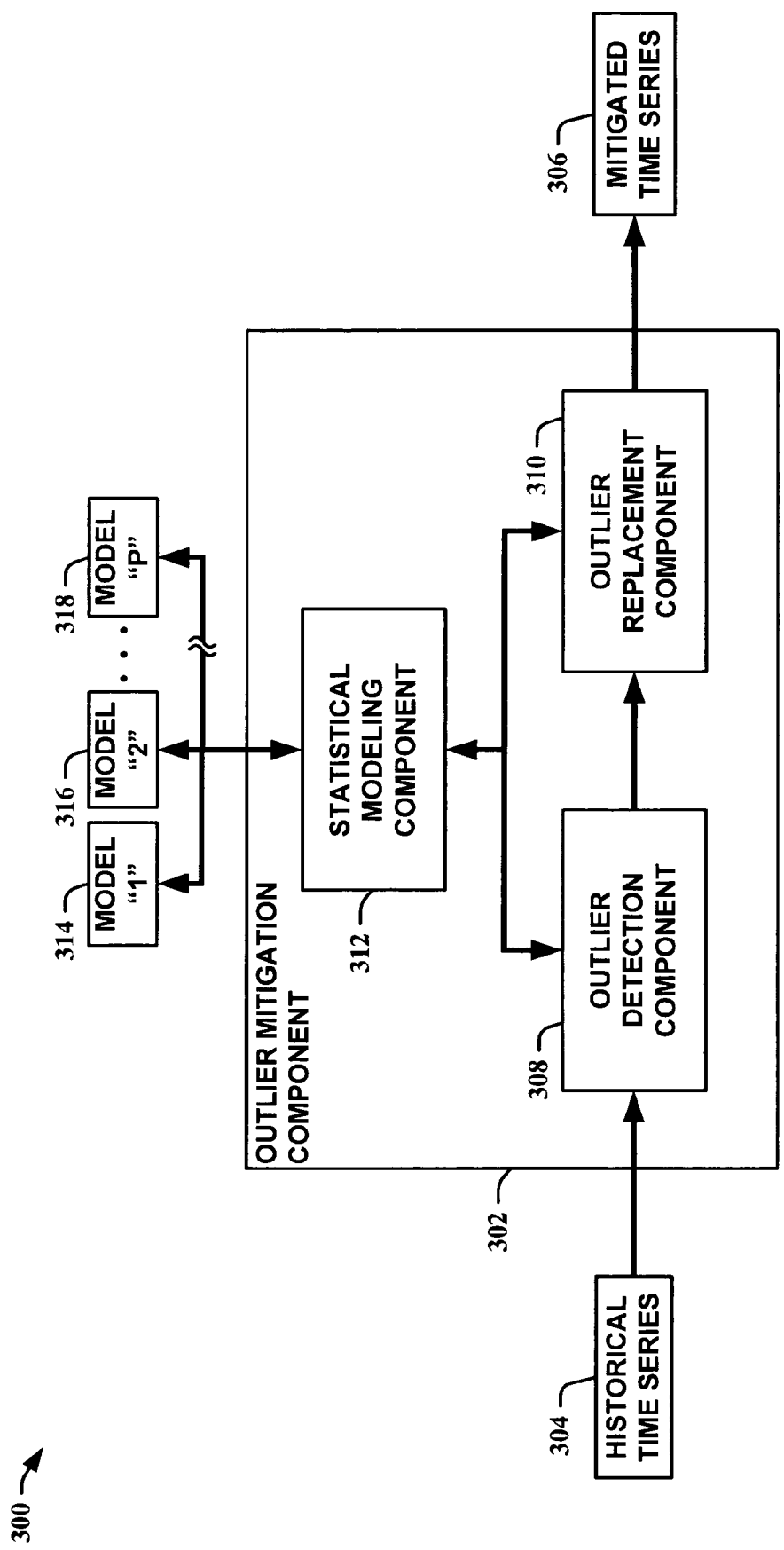
FIG. 3 is a block diagram of an outlier mitigation system in accordance with an aspect of an embodiment.

Turning to FIG. 3, a block diagram of an outlier mitigation system 300 in accordance with an aspect of an embodiment is illustrated. The outlier mitigation system 300 is comprised of an outlier mitigation component 302 that receives a historical time series 304 and provides a mitigated time series 306. The outlier mitigation component 302 is comprised of an outlier detection component 308, an outlier replacement component 310, and a statistical modeling component 312. The statistical modeling component 312 interfaces with models "1-P" 314-318, where P is an integer from one to infinity. The models "1-P" 314-318 can include, but are not limited to, statistical predictive models such as, for example, exponential smoothing models, autoregressive moving average (ARMA) models, autoregressive integrated moving average (ARIMA) models, and/or other similar classed models and the like.

The outlier detection component 308 receives the historical time series 304 and interacts with the statistical modeling component 312 to facilitate in detecting outliers in the historical time series 304. The statistical modeling component 312 can construct (e.g., utilize training data based on a time series of a data set) and/or interact with predictive statistical models "1-P" 314-318. This allows for different predictive models to be employed for different data slices (e.g., time periods, attributes, etc.) of the historical time series 304. Thus, for example, if it is desired to detect outliers for a time period between 1 pm and 2 pm on Thursdays, model "P" 318, for example, can be utilized for that particular time period. This allows substantial flexibility in utilizing the "best fit" predictive model for a particular data slice and substantially increases outlier detection performance. The statistical modeling component 312, in this instance, provides the outlier detection component 308 with an expected value and a standard deviation from an appropriately selected predictive model. The outlier detection component 308 then compares the expected value with the actual value and, if the standard deviation surpasses a predetermined and/or dynamic threshold (see, infra), an outlier is declared. The outlier detection component 308 then passes the historical time series 304 and the detected outlier(s) to the outlier replacement component 310.

The outlier replacement component 310 interacts with the statistical modeling component 312 to facilitate in removing the detected outlier(s). The statistical modeling component 312, employing the appropriately selected predictive model, provides the outlier replacement component 310 with the expected value(s) of the data point associated with the detected outlier(s). The outlier replacement component 310 replaces the outlier(s) in the historical time series 304 with the expected value(s) to provide the mitigated time series 306. The mitigation refers to the mitigation of the effect(s) of the outlier(s). The mitigated time series 306 can then be further utilized as a more accurate representation of the historical time series 304 for employment in predictive modeling. Although the statistical modeling component 312 is depicted as a separate functional block in FIG. 3, one skilled in the art can appreciate that the functionality provided by the statistical modeling component 312 can also be directly incorporated into the outlier detection component 308 and/or the outlier replacement component 310 and the like.

Figure 4:
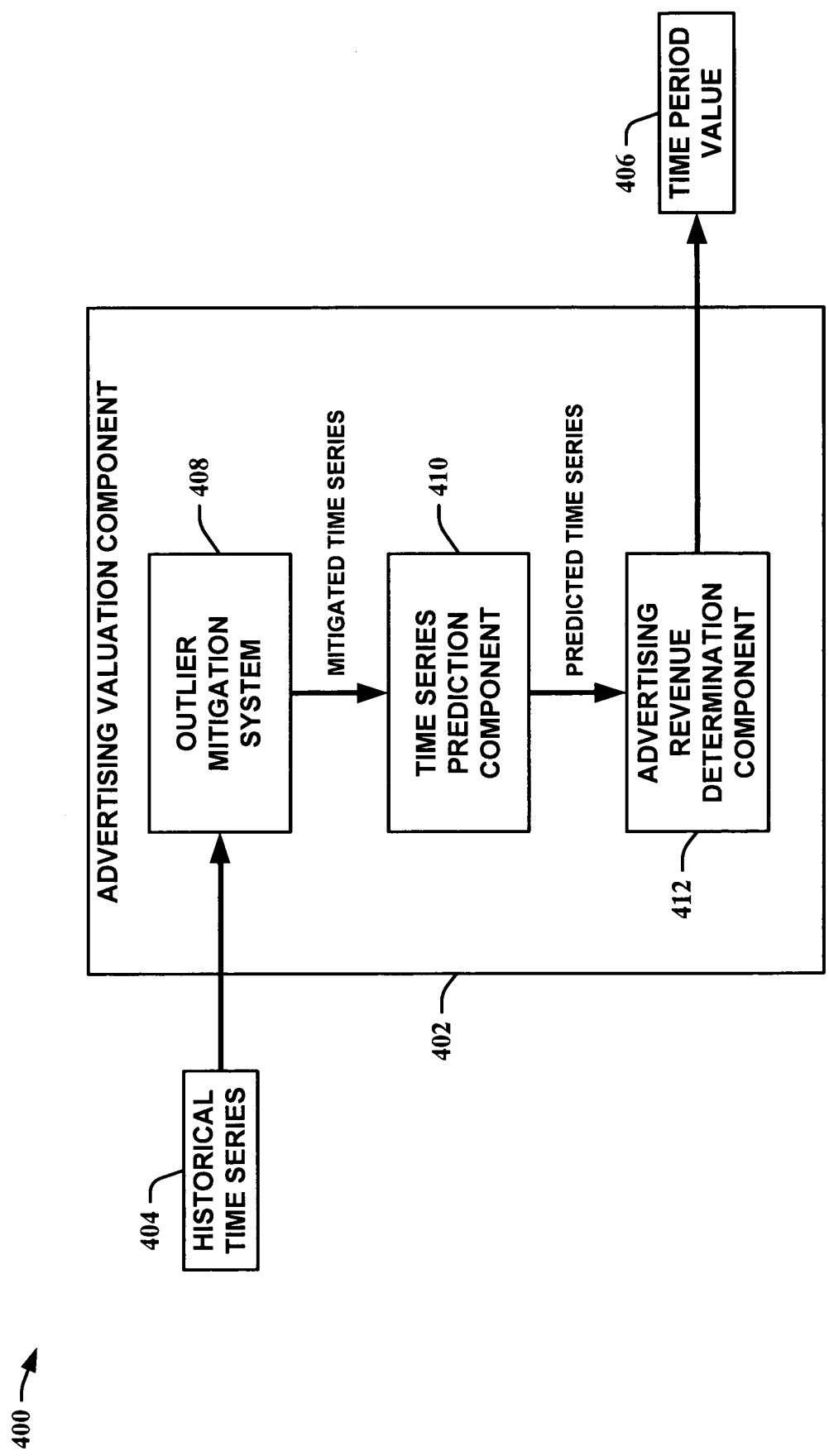
FIG. 4 is a block diagram of an advertising valuation system in accordance with an aspect of an embodiment.

Looking at FIG. 4, a block diagram of an advertising valuation system 400 in accordance with an aspect of an embodiment is shown. The advertising valuation system 400 is comprised of an advertising valuation component 402 that receives a historical time series 404 and provides a time period value 406. The advertising valuation component 402 is comprised of an outlier mitigation system 408, a time series prediction component 410, and an advertising revenue determination component 412. The outlier mitigation system 408 (see, supra examples) receives the historical time series 404. It 408 detects and replaces detected outliers in the historical time series 404 to provide a mitigated time series.

The time series prediction component 410 employs at least one predictive model to facilitate in providing a predicted time series based on the received mitigated time series from the outlier mitigation system 408. The predictive model utilized by the time series prediction component 410 can be, but is not required to be, a model employed by the outlier mitigation system 408. The advertising revenue determination component 412 receives the predicted time series and employs it to facilitate in determining the value of at least one particular time period to provide the time period value 406. The time period itself can include, but is not limited to, seconds, minutes, hours, etc. and/or singular approximate and/or exact forms such as a second, a minute, an hour, etc. For example, the time period value 406 can be based on expected web traffic for a web site from 2 pm to 4 pm on Wednesdays and Thursdays of a week. A value per unit can be predetermined and utilized to provide the final value by multiplying it and the expected value. This is a simplistic example and more complex algorithms can be utilized as well (e.g., algorithms that account for time of day, advertisement size, target audience, premiums for particular web sites, etc.).

There are many factors that can affect the value of an advertisement. Many large web sites receive the majority of traffic entering through top-level pages (also known as "portal" or "entry" pages) that contain content and links which, when clicked on, bring the visitor ("user") to other web pages in the site or network. Similarly, marketing materials and emails may contain links to a particular web page. Often, the content and link relationships on these top-level pages and materials are managed over time, where new content and links are modified or rotated upon either subsequent requests or some time duration, such as a number of hours or days. The number of web pages connected by links on the top-level pages at any one time is often a very small subset of available web pages on a site.

A "NetworkLocation" variable is a unique identifier that is used by online advertising engines to reference any web page or collection of web pages, and optional attributes such as placement within those pages, file type, and/or file size attributes. When a web page is related to the entry page through a link, NetworkLocations on that web page often receive many more "hits" than the web page normally receives through user navigation. This increase in traffic is recorded and this historical data is used to predict the volume of the network location.

If the prediction for future months is higher than the actual volume of the NetworkLocation received over the same period, then the system is said to have "over-predicted." Over-prediction leads to the over-booking of inventory; this may result in the under-delivery of advertiser commitments and lead to customer satisfaction issues.

Because publication of links is done on an inconsistent basis, or is scheduled closer to the impact date than when advertisers require prediction, the increased traffic on a NetworkLocation as a result of the linkage may have an undesirable impact on the prediction. Likewise, since the publication of links is often time and content sensitive (such as in the case of an entertainment news article), the historical spike in volume should be considered transient and should not be predicted upon.

Under-prediction can occur when the historical data for a NetworkLocation reflects a reduction in traffic volume, usually associated with any traffic decline due to holidays, hardware outages or issues, or software defects which are subsequently resolved. The drop in traffic can impact the prediction, including producing a value lower than what that time period will actually contain. Under-prediction results in lost revenue opportunity and the possible dilution of the advertising product's value through last-minute low-value or zero-revenue sales to utilize unsold inventory.

Systems and methods provided herein allow for detection of these dips and spikes in historical advertising data. These anomalies are referred to supra as "outliers." An outlier is defined as an extreme value that stands out from the rest of the other values in a univariate (i.e., one-variable) time series. In time-series forecasting, outliers play a critical role in defining the accuracy of prediction; the presence of outliers can negatively affect the quality of analyses unless these outliers are handled properly. Problems associated with outliers in a time series can be mitigated by building a statistical model to detect and replace these extreme values. In particular, at each point in the time series, the model produces (1) an expected value and (2) a standard deviation for the value. Whenever a value in the time series is observed that deviates by too many standard deviations from the expected value (e.g., 2), this presumed outlier is removed and replaced with the expected value produced by the model. After removing all the outliers in this manner, analyses can be performed (e.g., compute the average weekly traffic) based on the transformed data set.

Apart from seasonal fluctuations, there are many instances of outliers in historical NetworkLocation delivery data. Both positive and negative outliers are typically present in the data. A positive outlier is a value that is significantly higher than its expected value, and a negative outlier is a value that is significantly lower than its expected value. If a site is linked to a top-level page for one or more hours, its traffic during those hours increases and a positive outlier can occur. On the other hand, a site sometimes has scripting errors and until it is noticed and corrected it gets no traffic, in which case a negative outlier can occur.

Figure 5:
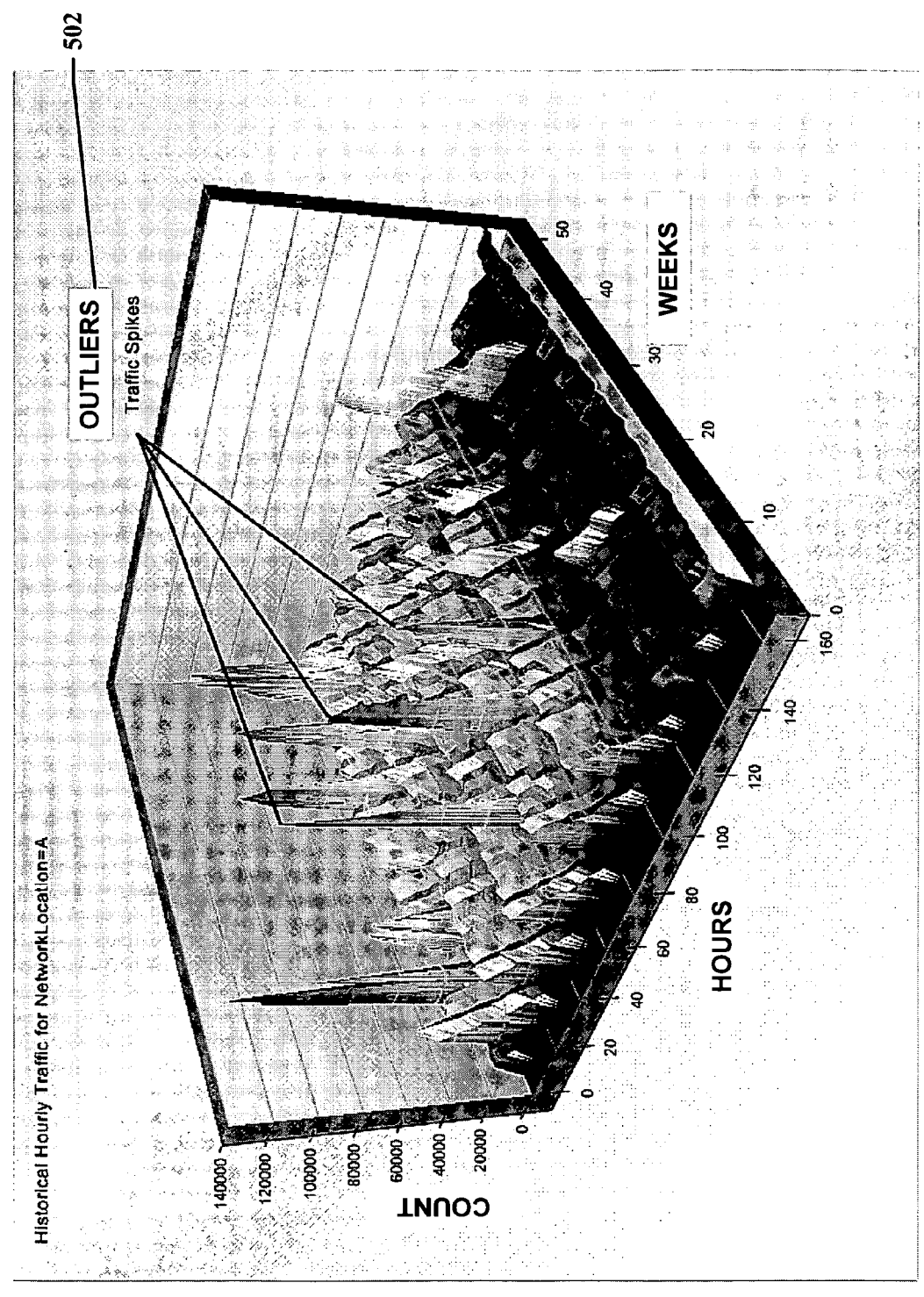
FIG. 5 is an illustration of hourly Internet web traffic for a NetworkLocation in accordance with an aspect of an embodiment.

In FIG. 5, an illustration 500 of hourly Internet web traffic for a NetworkLocation in accordance with an aspect of an embodiment is shown. It 500 shows an example of the presence of outliers 502 in a data set. It 500 shows a three-dimensional representation of an hourly volume for a particular NetworkLocation across 50 weeks. The z-axis shows the volume of the NetworkLocation, the x-axis shows the hours within a week, and the y-axis shows how the volume changes over the week span of the data (the oldest week has the highest y coordinates). As evident from data without outliers, the hourly volume stays within 50,000, but the presence of outliers 502 across random hours within a week pushes the hourly volume to more than 120,000. This has a negative impact on the accuracy of prediction going forward.

Because online advertising can be purchased, and have delivery restricted to, at the value of, for example, a single hour, accurate prediction of the future volume of that hour is critical for successful fulfillment of that commitment. Attempting to detect outliers with daily, weekly, or monthly aggregations of data has not proven to be reliable since advertising can be purchased and scheduled at the lower granularity of seconds, minutes, and/or hours and the like. As illustrated in FIG. 5, outlier data may occur over one or more hours in any specific week, and the hours may or may not be contiguous. Similarly, the hours with outlying values for a given week may not be the same hours week over week.

The presence of trend in weekly data identifies valid points as outliers if a value is deemed to be an outlier whenever it is, for example, more than 2 standard deviations away from the expected value. The outlier-mitigation algorithm outlined infra is based on the assumption that the distribution of volume for a NetworkLocation for a particular data slice (e.g., hour) follows a stable pattern across the week. Because every point on the hourly curve in a week is analyzed separately, the algorithm can handle the presence of outliers across multiple hours within a week.

The systems and methods herein utilize a statistical model to facilitate in predicting values in a time series. As described supra, the model provides an expected value and a standard deviation for each point in the series. A separate model is constructed for each hour (i.e., data slice) within a week (and/or a month, a year, a decade, etc.); thus each model, for a particular hour, predicts the traffic during that hour as a function of the week. For simplicity of this example, a single hour is utilized, and $h_j$ used to denote the observed impressions during that hour in week j (i.e., time point i in the time series).

To determine the expected value for each point, denoted by $E(h_j)$, an exponential smoothing model is utilized in this example. An exponential smoothing model allows accumulated expectations to be maintained without requiring additional resources (e.g., memory) to store prior values. It also adjusts quickly to learn when a spike is in fact an increase rather than an outlier. This model requires at least two points in the time series, and is defined recursively as follows:

$$E(h_2)=h_1$$

$$E(h_{j+1})=\alpha h_j+(1-\alpha)E(h_j) \text{ for } i>1 \quad \text{(Eq. 1)}$$

In other words, the expected value for a point is a linear combination of the previous value and the previous expected value. The above equation can be expanded to express the expected value for i>1 instead as an iterative function of all the observed values:

$$E(h_{i+1}) = \left(\sum_{k=2}^{i} \alpha(1-\alpha)^{i-k} h_k\right) + (1-\alpha)^{i-1} h_1 \quad \text{(Eq. 2)}$$

Although it is interesting to express the prediction in an iterative manner, in practice it is often easier to use (Eq. 1) to calculate the expectation "on the fly:" for each new data point, the expectation for the next point is updated by applying (Eq. 1).

The variance of (of any random variable) $h_i$, which is denoted by $Var(h_i)$, is defined as:

$$Var(h_i)=E([h_i-E(h_i)]^2) \quad \text{(Eq. 3)}$$

In words, the variance is the expected squared difference between the observation and the expectation. Expanding the squared term, and noting that $E(E(X))=E(X)$ yields:

$$Var(h_i)=E(h_i^2)-E(h_i)^2 \quad \text{(Eq. 4)}$$

Thus, given a model for the expected squared values in the sequence, it is easy to derive the variance. The expected squared values are modeled using another exponential smoothing model:

$$E(h_2^2)=h_1^2$$

$$E(h_{i+1}^2)=\beta \cdot h_i^2+(1-\beta)\cdot E(h_i^2) \text{ for } i>1 \quad \text{(Eq. 5)}$$

As in the calculation of $E(h_j)$, the expected square values can also be expressed using a weighted sum of observations.

To determine whether or not a value is an outlier, the difference between that value and the expected value is measured in terms of the standard deviation, denoted SD, which is simply the square root of the variance:

$$SD(h_i)=\sqrt{Var(h_i)} \quad \text{(Eq. 6)}$$

Once the outliers are detected, they can be replaced in the time series utilizing the model as well. Intuitively, whenever a value differs from its expected value by more than some constant (possibly non-integer) number of standard deviations, that value is replaced with its expectation. When removing an outlier, the squared value within the calculation of the variance is also replaced, but instead of using the expected square value, it is replaced with the squared value of the average of the expected value and the actual outlier value (described infra); this process ensures that if the time series is actually making a change (i.e., the value was not really an outlier), that it does not remove too many false-outlier values.

Following is a detailed example of the above approach. For each observed value $h_i(i>2)$, perform the outlier test: check if the absolute value of the deviation exceeds a constant m times the SD:

$$|h_i-E(h_i)|>m \cdot SD(h_i) \quad \text{(Eq. 7)}$$

If the desire is to remove only positive outliers, take away the absolute-value sign in the outlier test, and if the desire is to remove negative values, take away the absolute-value sign and reverse the comparison to >. If the outlier test succeeds:

1. Replace $h_j$ with $E(h_j)$, and compute $E(h_{j+1})$ using the new value.
2. Compute $E(h_{i+1}^2)$ but use $$\left(\frac{(h_i+E(h_i))}{2}\right)^2$$

in place of $h_i^2$ in (Eq. 5).

If the outlier test does not succeed, update $E(h_{j+1})$ and $E(h_{i+1}^2)$ as prescribed in (Eq. 1) and (Eq. 5), respectively. In some instances, there is a stabilization period when no mitigation is performed.

Figure 6:
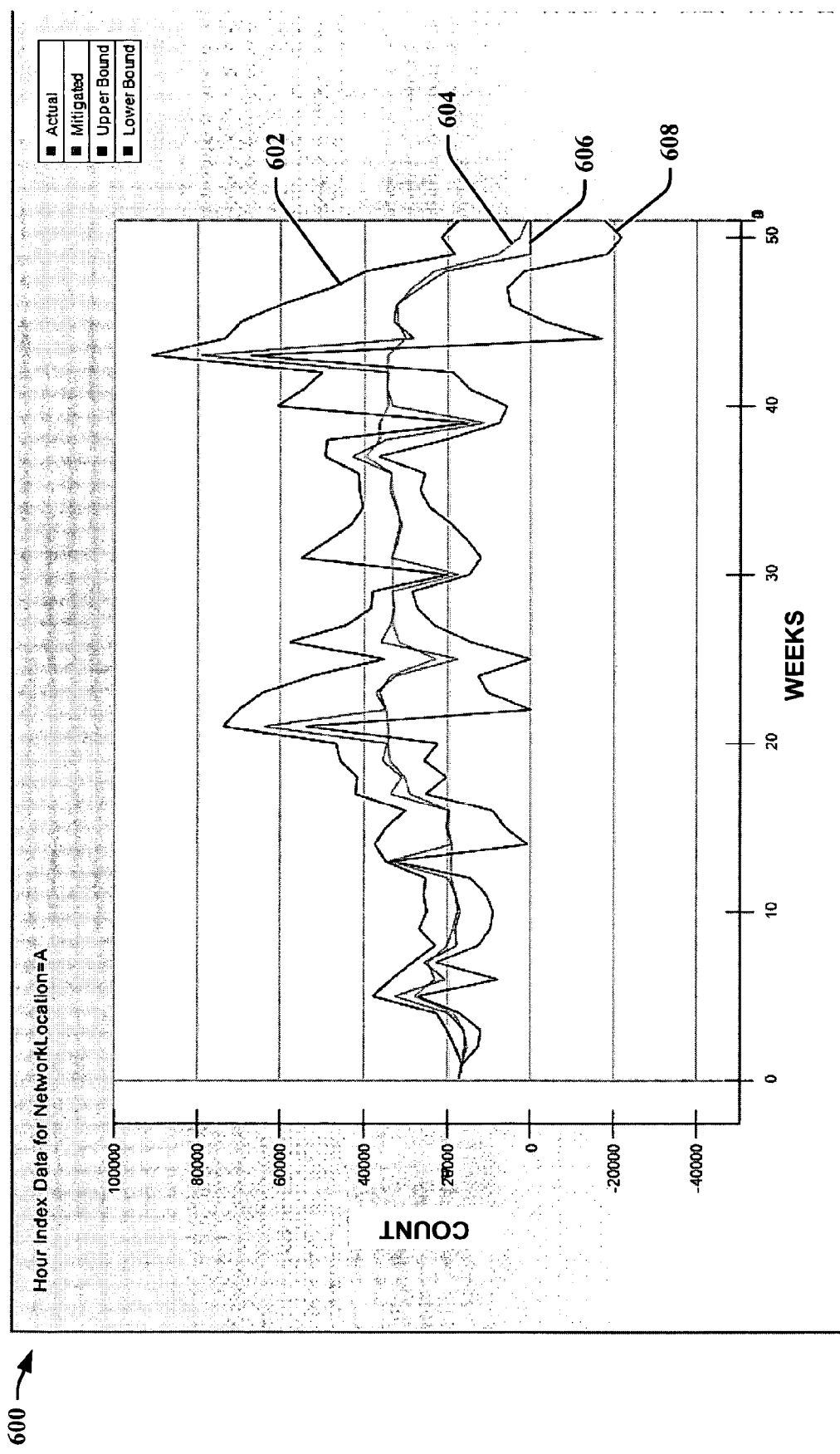
FIG. 6 is a graph depicting actual and mitigated data for a data slice of NetworkLocation Internet web traffic in accordance with an aspect of an embodiment.

As described supra, using the average in Step 2 above enables the algorithm to learn and adapt to changes happening to the distribution of data for a particular hour. If a particular hour is identified as an outlier, then the standard deviation increases in magnitude. So, if one or two more high values for the same hour across the weeks are witnessed, they are identified as regular hours and not as an outlier. FIG. 6 is a graph 600 that shows how the presence of outliers increases the standard deviation; whenever the actual line 606 below falls outside the standard-deviation bounds (upper bound 602 and lower bound 608, corresponding to m=2), then the standard deviation bounds expand. Removing the outliers provides a mitigated line 604.

Figure 7:
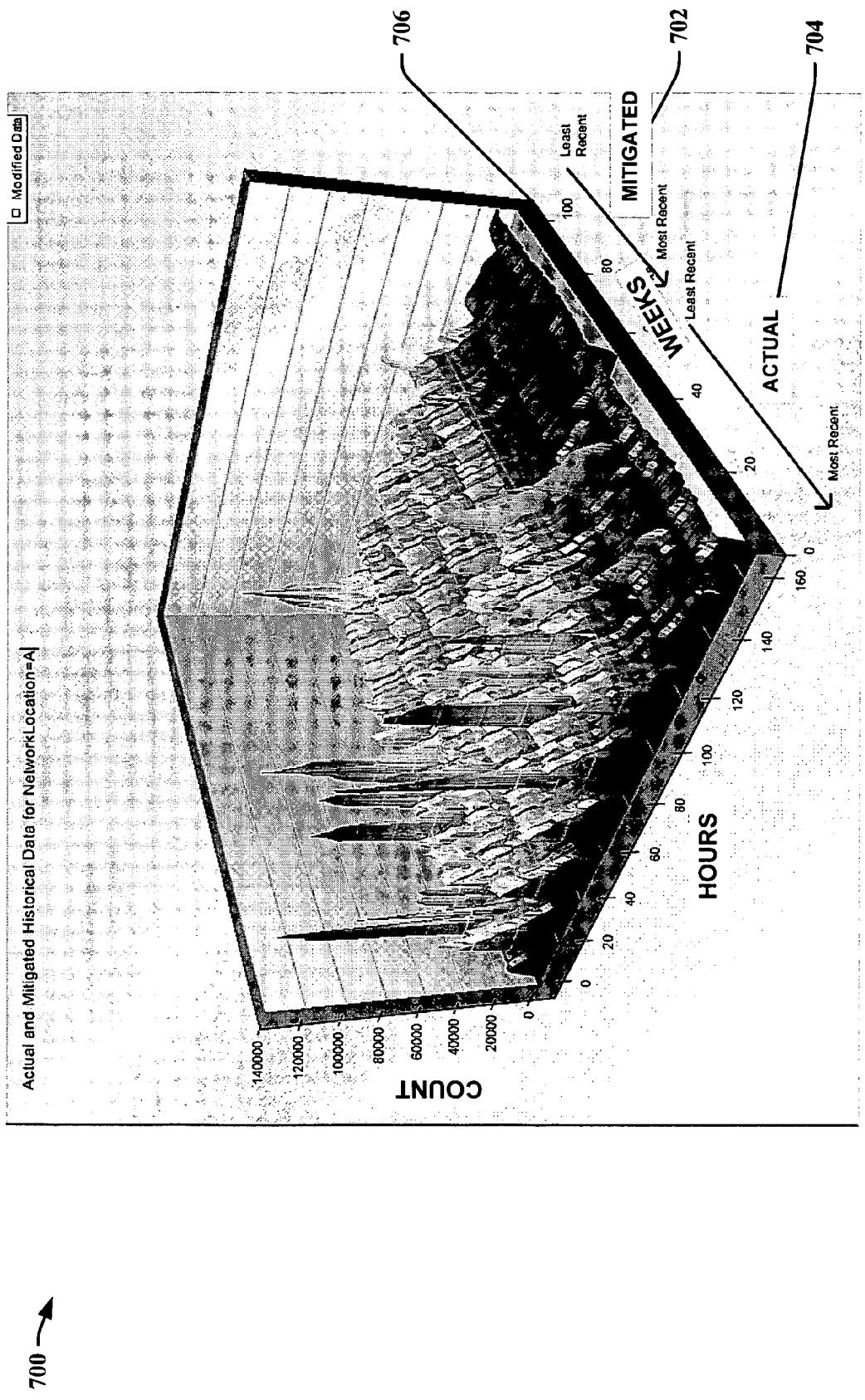
FIG. 7 is an illustration of actual and mitigated data for hourly Internet web traffic for a network location in accordance with an aspect of an embodiment.

FIG. 7 is an illustration 700 that shows the result of applying the outlier mitigation example on the same NetworkLocation data as shown in FIG. 5. The actual 704 and the mitigated 702 data has been plotted side-by-side for effective comparison. The minimum weekly number (on the week axis 706) for each data segment denotes the most recent week for that segment.

For example, for the instance where the data slice is based upon a time period which is a function of a day of a week, TABLE 1 outlines the algorithm for outlier mitigation of hours of a week:

TABLE 1

Algorithm for Outlier Mitigation of Hours of a Week

1. If more than one week of data available
    1.1 For each hour in the current week
        1.1.1 If count for current hour is greater than same hour previous week + allowable tolerance and number of week processed greater than stabilizing period(NumberWeeksToStabilize)
            1.1.1.1 Store count for same hour previous week as count for current week.
            1.1.1.2 Store modified squared count equal to the squared value for the mean of count for the current week and count for the same hour previous week.
        1.1.2 Else
            1.1.2.1 Do exponential smoothing with count for the current week and count for the same hour previous week.
            1.1.2.2 Do exponential smoothing with squared count for the current week and squared count for the same hour previous week.
        1.1.3 End If
    1.2 Next
2. End If In view of the exemplary systems shown and described above, methodologies that may be implemented in accordance with the embodiments will be better appreciated with reference to the flow charts of FIGS. 8-10. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 8:
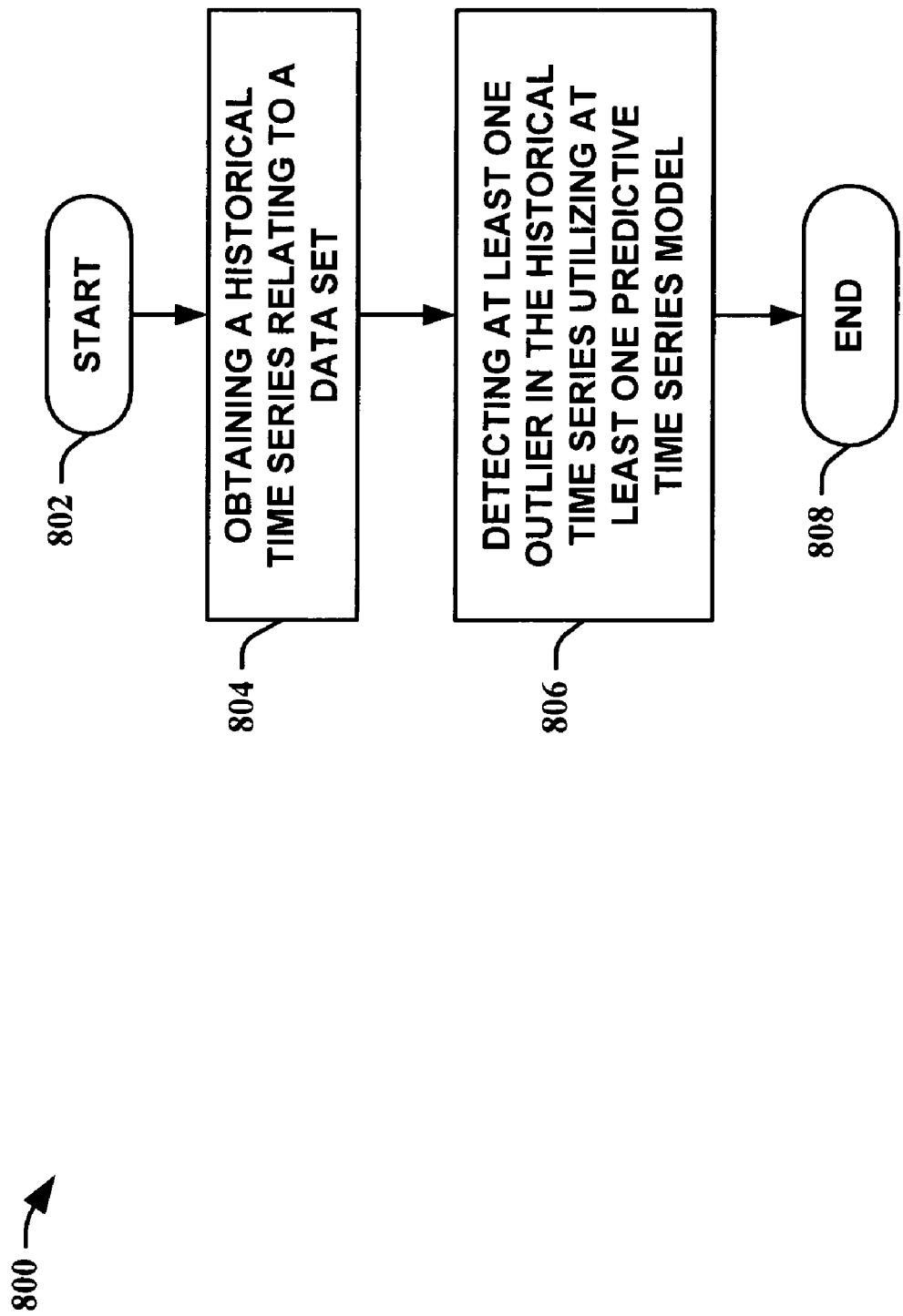
FIG. 8 is a flow diagram of a method of facilitating data anomaly mitigation in accordance with an aspect of an embodiment.

In FIG. 8, a flow diagram of a method 800 of facilitating data anomaly mitigation in accordance with an aspect of an embodiment is shown. The method 800 starts 802 by obtaining a historical time series relating to a data set 804. At least one outlier in the historical time series is then detected utilizing at least one predictive time series model 806, ending the flow 808. The predictive time series model can include, but is not limited to, an exponential smoothing model (described supra), an autoregressive moving average (ARMA) model, an autoregressive integrated moving average (ARIMA) model, and/or other similar classed models and the like. The detection is generally accomplished by obtaining an expected value and a standard deviation for a particular data point from the predictive model. A threshold (predetermined and/or dynamic) is then utilized to determine if the actual value and the expected value are different enough to call the actual value an outlier. Once detected, the outliers can be replaced to facilitate in mitigating the effects of the outliers on predicted data.

Figure 9:
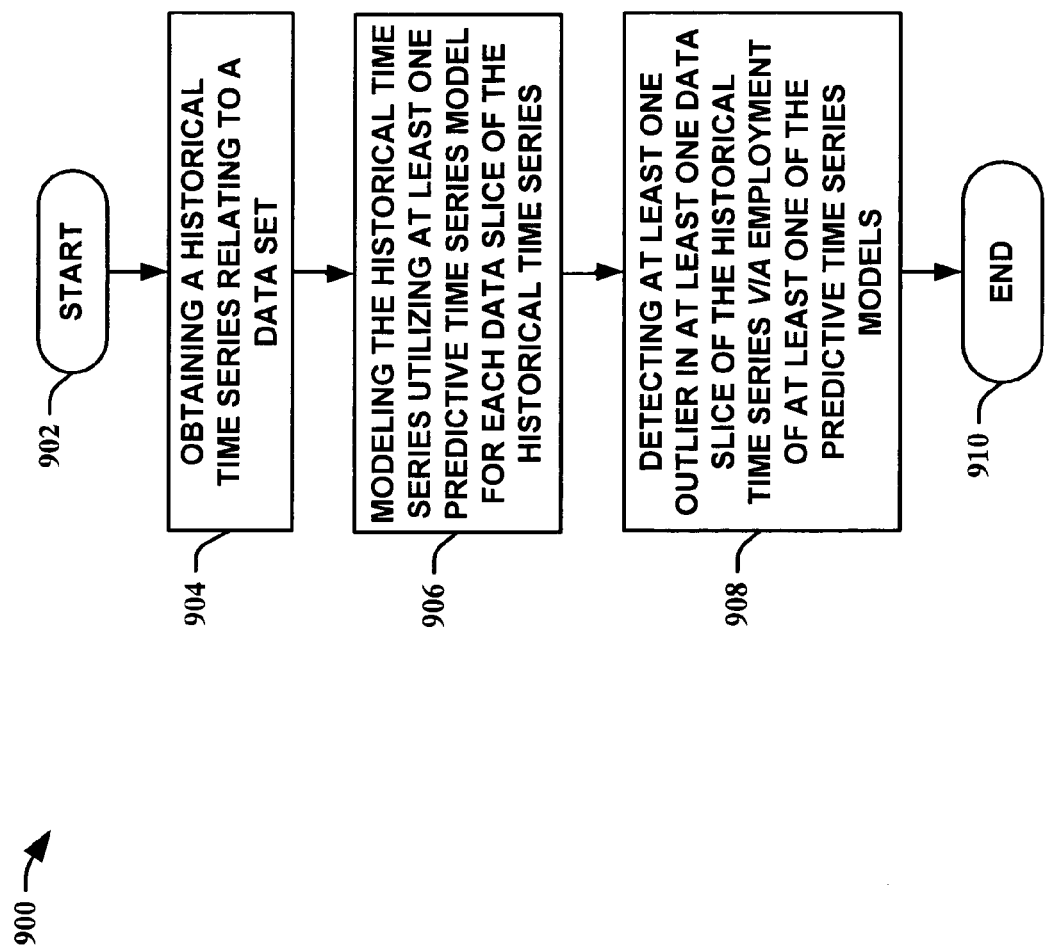
FIG. 9 is another flow diagram of a method of facilitating data anomaly mitigation in accordance with an aspect of an embodiment.

Turning to FIG. 9, another flow diagram of a method 900 of facilitating data anomaly mitigation in accordance with an aspect of an embodiment is depicted. The method 900 starts 902 by obtaining a historical time series relating to a data set 904. The historical time series is then modeled utilizing at least one predictive time series model for each data slice of the historical time series 906. The predictive time series models can include, but are not limited to, an exponential smoothing model (described supra), an autoregressive moving average (ARMA) model, an autoregressive integrated moving average (ARIMA) model, and/or other similar classed models and the like. The data slices can be temporal and/or non-temporal attributes of a data set represented by the historical time series. The non-temporal attributes associated with the data set can include, but are not limited to, demographic, geographic, behavioral, location, and/or advertisement size information and the like. For example, the data slice can be a time slice from 5 pm to 7 pm on Fridays and/or another axis of a time series related to an attribute of the data set such as the gender of users of a web site. At least one outlier in at least one data slice of the historical time series is then detected via employment of at least one of the predictive time series models 908, ending the flow 910. The detection is generally accomplished by obtaining an expected value and a standard deviation for a particular data point from the predictive model. A threshold (predetermined and/or dynamic) is then utilized to determine if the actual value and the expected value are different enough to call the actual value an outlier. Once detected, the outliers can be replaced to facilitate in mitigating the effects of the outliers on predicted data.

Figure 10:
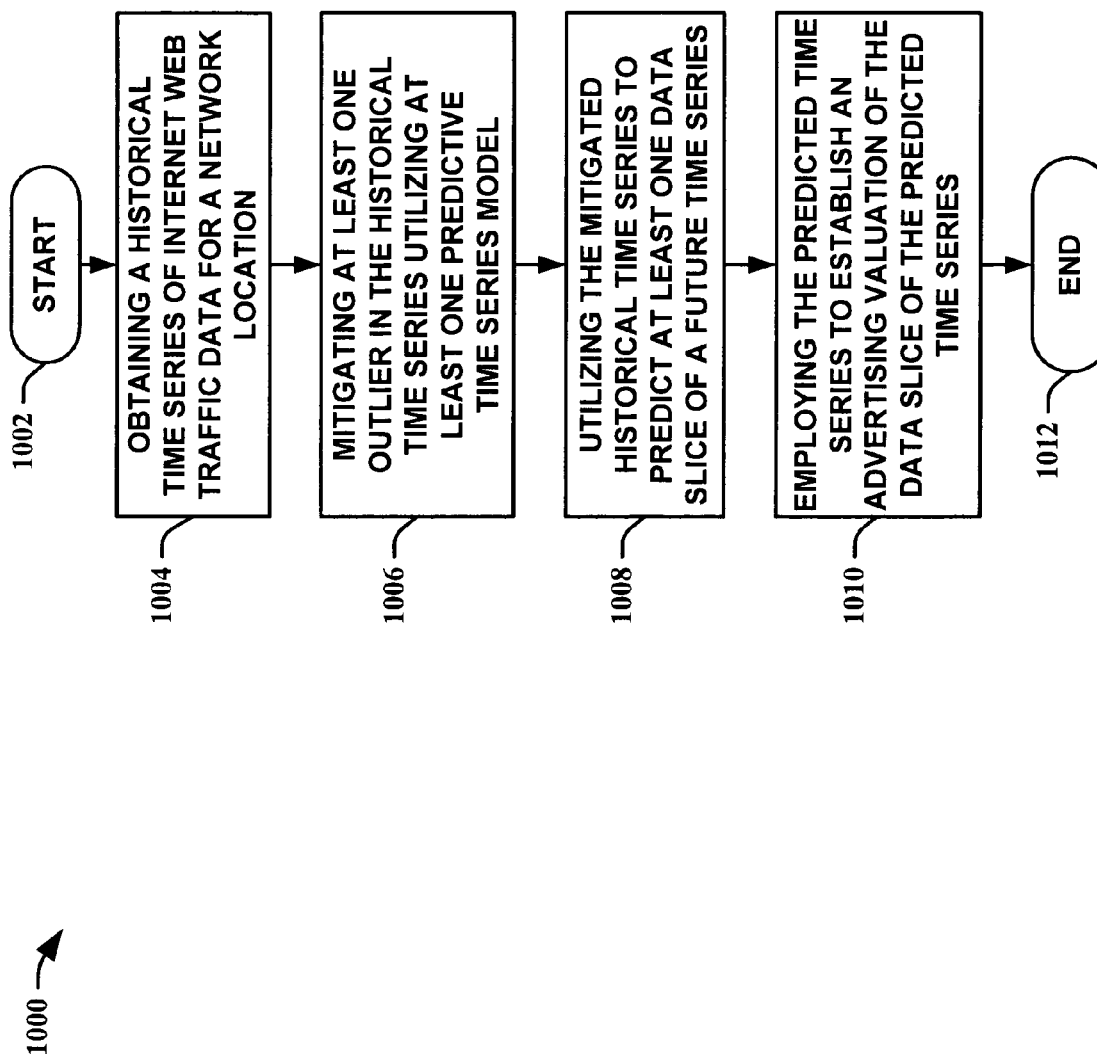
FIG. 10 is a flow diagram of a method of facilitating advertising valuation in accordance with an aspect of an embodiment.

Looking at FIG. 10, a flow diagram of a method 1000 of facilitating advertising valuation in accordance with an aspect of an embodiment is illustrated. The method 1000 starts 1002 by obtaining a historical time series of internet web traffic data for a network location 1004. At least one outlier in the historical time series is then mitigated utilizing at least one predictive time series model 1006. The mitigation is generally accomplished by replacing a detected outlier with an expected value obtained from the predictive time series model. The mitigated historical time series is then utilized to predict at least one data slice of a future time series 1008. The predicted time series is then employed to establish an advertising valuation of the data slice of the predicted time series 1010, ending the flow 1012. A value per unit can be predetermined and/or dynamically determined (e.g., dynamically monitoring the popularity of a web site, etc.) and utilized to provide the final valuation by multiplying it and the expected value. This is a simplistic example and more complex algorithms can be utilized as well (e.g., algorithms that account for time of day, advertisement size, target audience, premiums for particular web sites, network location, etc.).

Figure 11:
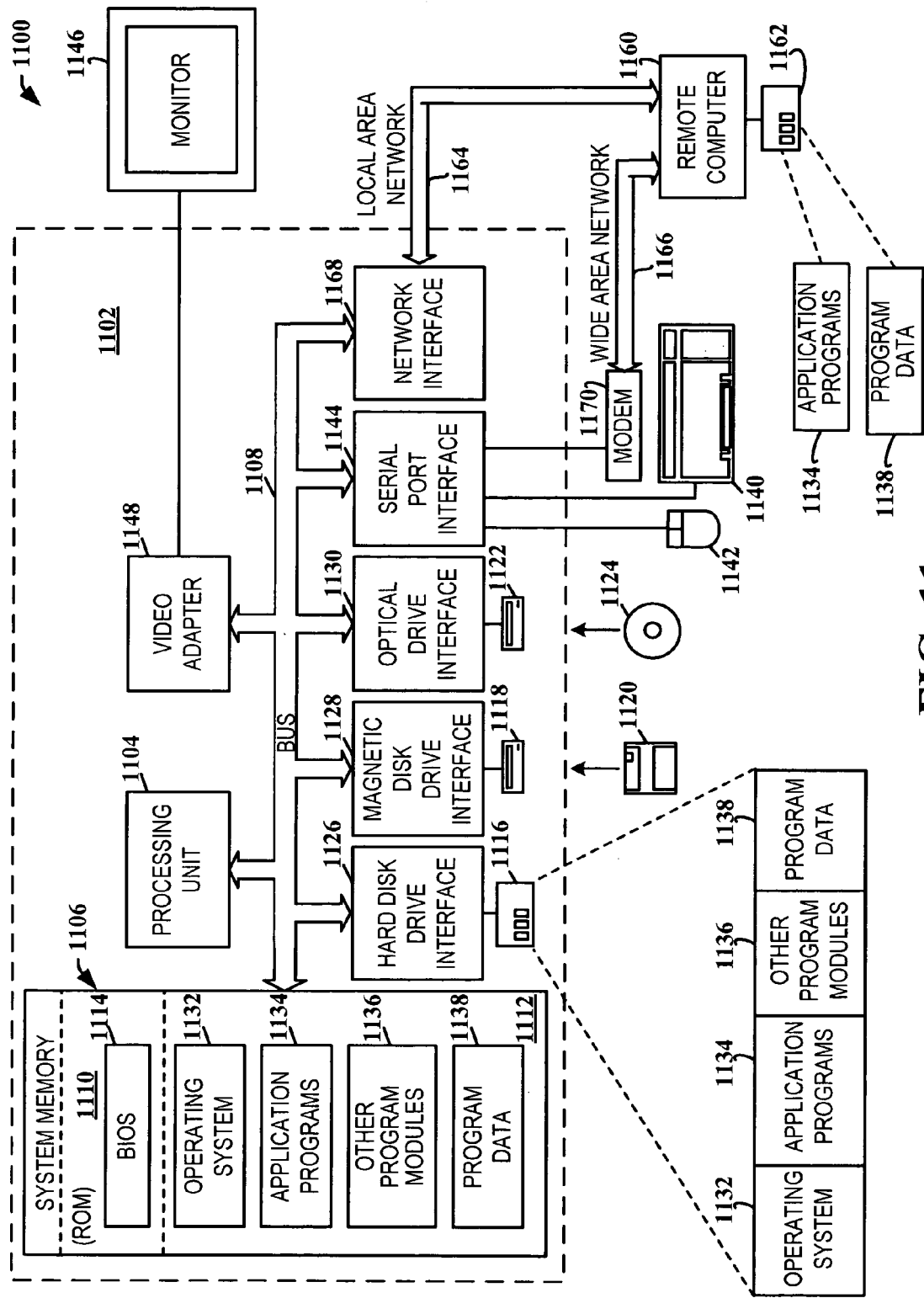
FIG. 11 illustrates an example operating environment in which an embodiment can function.

In order to provide additional context for implementing various aspects of the embodiments, FIG. 11 and the following discussion is intended to provide a brief, general description of a suitable computing environment 1100 in which the various aspects of the embodiments may be implemented. While the embodiments have been described above in the general context of computer-executable instructions of a computer program that runs on a local computer and/or remote computer, those skilled in the art will recognize that the embodiments may also be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the embodiments may also be practiced in distributed computing environments where certain tasks are performed by remote processing devices that are linked through a communications network. However, some, if not all, aspects of the embodiments may be practiced on standalone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 11, an exemplary system environment 1100 for implementing the various aspects of the embodiments include a conventional computer 1102, including a processing unit 1104, a system memory 1106, and a system bus 1108 that couples various system components, including the system memory, to the processing unit 1104. The processing unit 1104 may be any commercially available or proprietary processor. In addition, the processing unit may be implemented as multi-processor formed of more than one processor, such as may be connected in parallel.

The system bus 1108 may be any of several types of bus structure including a memory bus or memory controller, a peripheral bus, and a local bus using any of a variety of conventional bus architectures such as PCI, VESA, Microchannel, ISA, and EISA, to name a few. The system memory 1106 includes read only memory (ROM) 1110 and random access memory (RAM) 1112. A basic input/output system (BIOS) 1114, containing the basic routines that help to transfer information between elements within the computer 1102, such as during start-up, is stored in ROM 1110.

The computer 1102 also may include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1100, and further that any such media may contain computer-executable instructions for performing the methods of the embodiments.

A number of program modules may be stored in the drives 1116-1122 and RAM 1112, including an operating system 1132, one or more application programs 1134, other program modules 1136, and program data 1138. The operating system 1132 may be any suitable operating system or combination of operating systems. By way of example, the application programs 1134 and program modules 1136 can include an outlier detection and/or mitigation scheme in accordance with an aspect of an embodiment.

A user can enter commands and information into the computer 1102 through one or more user input devices, such as a keyboard 1140 and a pointing device (e.g., a mouse 1142). Other input devices (not shown) may include a microphone, a joystick, a game pad, a satellite dish, a wireless remote, a scanner, or the like. These and other input devices are often connected to the processing unit 1104 through a serial port interface 1144 that is coupled to the system bus 1108, but may be connected by other interfaces, such as a parallel port, a game port or a universal serial bus (USB). A monitor 1146 or other type of display device is also connected to the system bus 1108 via an interface, such as a video adapter 1148. In addition to the monitor 1146, the computer 1102 may include other peripheral output devices (not shown), such as speakers, printers, etc.

It is to be appreciated that the computer 1102 can operate in a networked environment using logical connections to one or more remote computers 1160. The remote computer 1160 may be a workstation, a server computer, a router, a peer device or other common network node, and typically includes many or all of the elements described relative to the computer 1102, although for purposes of brevity, only a memory storage device 1162 is illustrated in FIG. 11. The logical connections depicted in FIG. 11 can include a local area network (LAN) 1164 and a wide area network (WAN) 1166. Such networking environments are commonplace in offices, enterprise-wide computer networks, intranets and the Internet.

When used in a LAN networking environment, for example, the computer 1102 is connected to the local network 1164 through a network interface or adapter 1168. When used in a WAN networking environment, the computer 1102 typically includes a modem (e.g., telephone, DSL, cable, etc.) 1170, or is connected to a communications server on the LAN, or has other means for establishing communications over the WAN 1166, such as the Internet. The modem 1170, which can be internal or external relative to the computer 1102, is connected to the system bus 1108 via the serial port interface 1144. In a networked environment, program modules (including application programs 1134) and/or program data 1138 can be stored in the remote memory storage device 1162. It will be appreciated that the network connections shown are exemplary and other means (e.g., wired or wireless) of establishing a communications link between the computers 1102 and 1160 can be used when carrying out an aspect of an embodiment.

In accordance with the practices of persons skilled in the art of computer programming, the embodiments have been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits which causes a resulting transformation or reduction of the electrical signal representation, and the maintenance of data bits at memory locations in the memory system (including the system memory 1106, hard drive 1116, floppy disks 1120, CD-ROM 1124, and remote memory 1162) to thereby reconfigure or otherwise alter the computer system's operation, as well as other processing of signals. The memory locations where such data bits are maintained are physical locations that have particular electrical, magnetic, or optical properties corresponding to the data bits.

Figure 12:
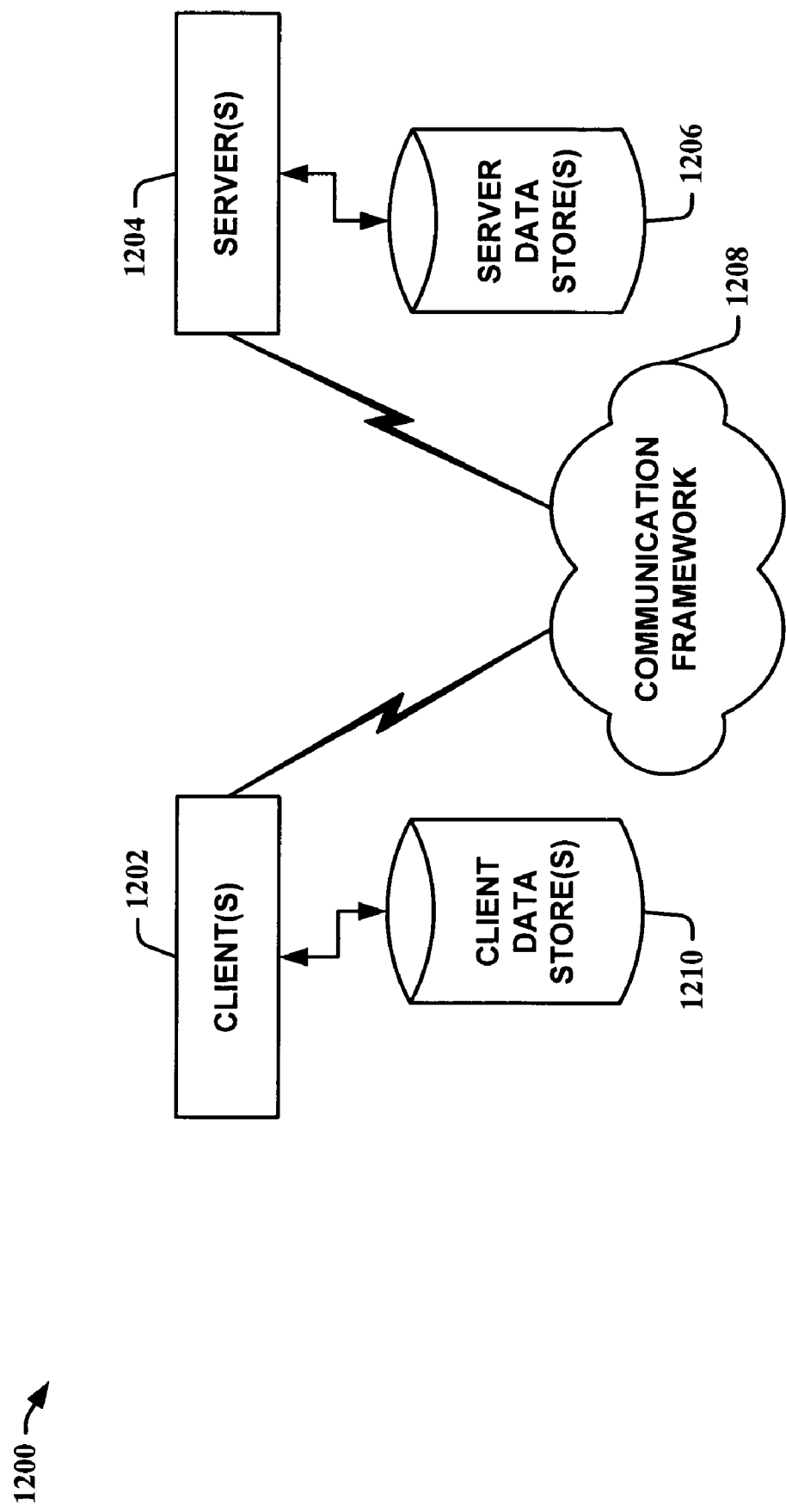
FIG. 12 illustrates another example operating environment in which an embodiment can function.

FIG. 12 is another block diagram of a sample computing environment 1200 with which embodiments can interact. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 may be in the form of a data packet adapted to be transmitted between two or more computer processes. The system 1200 includes a communication framework 1208 that can be employed to facilitate communications between the client(s) 1202 and the server(s) 1204. The client(s) 1202 are connected to one or more client data store(s) 1210 that can be employed to store information local to the client(s) 1202. Similarly, the server(s) 1204 are connected to one or more server data store(s) 1206 that can be employed to store information local to the server(s) 1204.

It is to be appreciated that the systems and/or methods of the embodiments can be utilized in outlier detection and/or mitigation facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data anomaly mitigation, comprising:
    a receiving component that receives at least one historical time series relating to an Internet web traffic data set; a statistical modeling component that constructs and/or obtains at least one predictive model for each data slice of the historical time series, at least one data slice is a time period of Internet web traffic that is a function of a day, a week, a month, and/or a year; an outlier determination component that detects outliers in the historical time series utilizing at least one predictive model, wherein the outlier determination component employs at least one predictive model to facilitate determination of an expected value of an actual historical time series value and utilizes a multiple of a standard deviation of the actual historical time series value to the expected time series value to detect an outlier, and an outlier replacement component that replaces at least one detected outlier with its expected value to facilitate in mitigating an effect of the outlier on the historical time series.

2. The system of claim 1, the time period is approximately one hour.

3. The system of claim 1, the outlier determination component utilizes at least one non-temporal attribute associated with the data set to detect at least one outlier.

4. The system of claim 3, the non-temporal attribute associated with the data set comprising demographic, geographic, behavioral, location, and/or advertisement size information relating to Internet web traffic of a network location.

5. The system of claim 1, the predictive model comprising an exponential smoothing model, an autoregressive moving average (ARMA) model, and/or an autoregressive integrated moving average (ARIMA) model.

6. The system of claim 1 further comprising:
    a time series prediction component that employs the mitigated historical time series to facilitate in predicting at least one data slice of a fixture time series.

7. The system of claim 6, the time series prediction component employs a predictive model utilized by the outlier detection component to facilitate in predicting the data slice of the future time series.

8. An online advertising revenue determination system that employs the system of claim 1.

9. A device employing the system of claim 1 comprising at least one selected from the group consisting of a computer, a server, and a handheld electronic device.

10. A method for facilitating data anomaly mitigation, comprising:
    obtaining at least one historical time series relating to a data set;
    modeling the historical time series utilizing at least one predictive time series model for each data slice of the historical time series;
    detecting at least one outlier in at least one data slice of the historical time series utilizing at least one of the predictive time series models;
    determining an expected value of an actual historical time series value via a predictive time series model; and
    utilizing a multiple of a standard deviation of the actual historical time series value to the expected time series value to detect an outlier; and
    replacing a detected outlier with its expected value to mitigate an effect of the outlier on the historical time series.

11. The method of claim 10 further comprising:
    employing the mitigated historical time series to facilitate in predicting at least one data slice of a future time series.

12. The method of claim 11 further comprising:
    employing the predicted time series to establish an online advertising valuation of the data slice of the predicted time series.

13. The method of claim 10, the predictive time series model comprising an exponential smoothing model, an autoregressive moving average (ARMA) model, and/or an autoregressive integrated moving average (ARIMA) model.

14. The method of claim 10, at least one data slice is a time period of Internet web traffic for a network location and is a function of a day, a week, a month, and/or a year.

15. A system that facilitates data anomaly mitigation, comprising:
   means for receiving at least one historical time series relating to a data set;
   means for detecting at least one outlier in the historical time series utilizing at least one predictive model;
   means for determining an expected value of an actual historical time series value via a predictive time series model; and utilizing a multiple of a standard deviation of the actual historical time series value to the expected time series value to detect an outlier; and
   means for replacing a detected outlier with its expected value to mitigate an effect of the outlier on the historical time series.

16. A device employing the system of claim 15 comprising at least one selected from the group consisting of a computer, a server, and a handheld electronic device.

* * * * *